US010126820B1

(12) United States Patent
Chang et al.

(10) Patent No.: US 10,126,820 B1
(45) Date of Patent: Nov. 13, 2018

(54) OPEN AND CLOSED HAND DETECTION

(71) Applicant: Rawles LLC, Wilmington, DE (US)

(72) Inventors: Samuel Henry Chang, San Jose, CA (US); Ning Yao, Cupertino, CA (US); Sowmya Gopalan, Cupertino, CA (US); Rahul Agrawal, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 13/689,525

(22) Filed: Nov. 29, 2012

(51) Int. Cl.
G06F 3/01 (2006.01)

(52) U.S. Cl.
CPC .................... G06F 3/017 (2013.01)

(58) Field of Classification Search
CPC ........ G06F 3/017; G06F 3/011; G06F 3/0317; G06K 9/4652; G06K 9/00355; G01B 11/002; G01B 11/2433; G01B 11/25; G06T 7/0053; G06T 7/0057; G06T 2207/30196; G01S 3/7864; G01S 17/87
USPC ................................................. 345/156–184
See application file for complete search history.

(56) References Cited

U.S. PATENT DOCUMENTS

| 4,843,568 | A * | 6/1989 | Krueger et al. ............... 382/100 |
| 7,227,526 | B2 * | 6/2007 | Hildreth et al. .............. 345/156 |
| 9,870,056 | B1 * | 1/2018 | Yao .......................... G06F 3/017 |
| 2004/0101192 | A1 * | 5/2004 | Yokoyama ............ G06T 7/0042 382/153 |
| 2008/0181459 | A1 * | 7/2008 | Martin ................ G06K 9/00355 382/103 |
| 2010/0021014 | A1 * | 1/2010 | Bebis ................. G06K 9/00375 382/115 |
| 2011/0074675 | A1 * | 3/2011 | Shiming et al. .............. 345/158 |
| 2011/0211754 | A1 * | 9/2011 | Litvak ................ G06K 9/00375 382/165 |
| 2011/0243380 | A1 * | 10/2011 | Forutanpour ........... G06F 3/017 382/103 |
| 2011/0268365 | A1 * | 11/2011 | Lou et al. ...................... 382/224 |
| 2012/0062736 | A1 * | 3/2012 | Xiong ........................... 348/143 |
| 2012/0068917 | A1 * | 3/2012 | Huang .................... G06F 3/017 345/156 |
| 2012/0223885 | A1 | 9/2012 | Perez |
| 2012/0249741 | A1 * | 10/2012 | Maciocci ................ G06F 3/011 348/46 |
| 2012/0309532 | A1 * | 12/2012 | Ambrus et al. ................. 463/36 |
| 2013/0271370 | A1 * | 10/2013 | Wang et al. .................. 345/158 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Primary Examiner — Amare Mengistu
Assistant Examiner — Gloryvid Figueroa-Gibson
(74) Attorney, Agent, or Firm — Lee & Hayes, PLLC

(57) ABSTRACT

Detection of human hands within an environment is used for gesture recognition for input to a computing system. Detecting a hand is non-trivial, however, because the appearances of a hand vary widely with many independent digits and moving parts. A feature-based similarity measurement is used to detect two specific hand positions—an open hand and a closed hand.

20 Claims, 9 Drawing Sheets

(56) References Cited

U.S. PATENT DOCUMENTS

2013/0278504 A1* 10/2013 Tong .................. G06F 3/017
                                                                        345/158

* cited by examiner

//OPEN AND CLOSED HAND DETECTION

BACKGROUND

User interfaces have traditionally relied on input devices such as keyboards, which require physical manipulation by a user. For instance, traditional human-to-computer interface are based on some form of physical touch, such as depressing keys on a computer keyboard, moving a mouse and clicking a button, moving a joystick, tapping a touch screen, and so forth. This physical type of human-to-computer interface is reliable and precise.

Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

One challenge with recognizing hand gestures is to first recognize that the object in the environment is a hand, i.e., that a hand does indeed exist. Recognizing a hand is more difficult that other objects because the hand is complex with many independently moveable parts that may be observed as infinitely varying shapes, forms, and orientations. There are so many ways to represent a hand.

Traditional feature-based shape matching approaches have been developed for target recognition and classification. Unfortunately, such approaches are neither flexible enough to model multiple appearances of a hand nor accurate enough to match a model to a target with small degrees of visual differences.

Accordingly, there is a need to improve ways to recognize hands to facilitate more accurate gesture detection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for detecting human hands within an environment, such as during gesture recognition for input to a computing system. Detecting hands is non-trivial, due to the complexity of modeling hands in motion. The appearances of a hand vary widely because the hand is not a rigid object, but has many independent digits and moving parts, making the degree of movement of a hand very high. Even the simplest and the most common appearances of an open hand and a closed hand can be very different from one user to another. The techniques described below employ a feature-based similarity measurement to detect an open hand or a closed hand.

For purposes of continuing discussion, an open hand is defined as a hand with all five fingers visible and separately distinguishable in a depth-based contour from a processed image. For instance, an open hand is similar in appearance to a user showing a count of five on his or her hand. A closed hand is defined as hand configurations where all five fingers are not visible and separately distinguishable in a depth-based contour from a processed image. In other words, a closed hand is defined as not being an open hand. In one particular implementation described below, a closed hand has four fingers extended from the palm, but touching one another, and an extended thumb that is separate from the four fingers. A closed hand might resemble, for example, a traffic control officer holding up his or her hand to indicate "stop".

In one implementation, a hand detection system is configured to analyze depth information of an image captured from an environment, where the image includes a hand. A segmentation process is applied to create a contour of the hand. The system then maps the contour of the hand onto a one dimensional (1D) curvature map by translating points along the periphery of the contour into values on the curvature map. The system further maps the distance between any two neighbor points around the periphery of the hand onto a 1D distance map. Next, the hand detection system generates characteristics points from the curvature and distant maps. These characteristic points may then be used in different techniques to detect the existence of an open hand or a closed hand.

The techniques may be implemented in many different contexts. In certain implementations described below, the techniques are implemented as part of an augmented reality environment in which projectors and cameras create a three dimensional environment in which users can interact with objects and content. Hand gestures may be used in such augmented reality environments. However, the techniques may also be implemented in other computer-based systems that employ hand gesture recognition.

Example Environment

Figure 1:
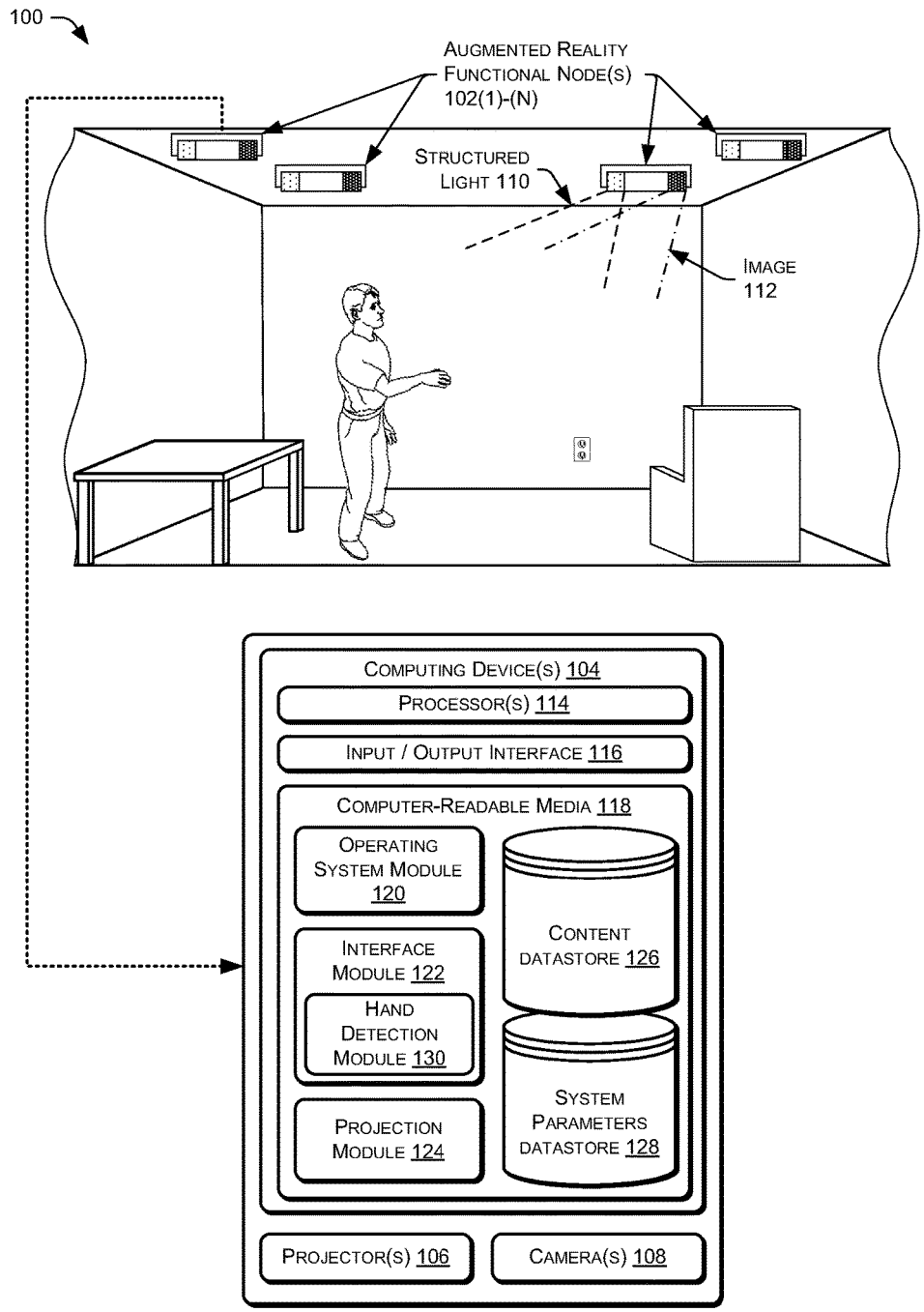
FIG. 1 illustrates an environment that includes an augmented reality functional node (ARFN) and a user that may interact with the ARFN using hand gestures.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that may capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user without reference to a UI projected within the environment.

In this example, one of the ARFNs 102 within the environment is shown to project structured light 110. In addition, the ARFN may capture one or more images 112 within the environment for the purpose of identifying distortions in the structured light 110. While FIG. 1 illustrates one ARFN projecting this structured light and imaging the environment to identify the distortions, in some implementations, one or more other ARFNs may additionally or alternatively perform these functions. In either instance, by imaging the environment in this manner, the ARFNs 102 may identify the user's gestures within the environment. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects, such as a hand, in a scene.

As illustrated, the computing device 104 of the example ARFN 102 includes one or more processors 114, an input/output interface 116, and memory or computer-readable media 118. The processors 114 may be configured to execute instructions, which may be stored in the computer-readable media 118 or in other computer-readable media accessible to the processors 114.

Figure 2:
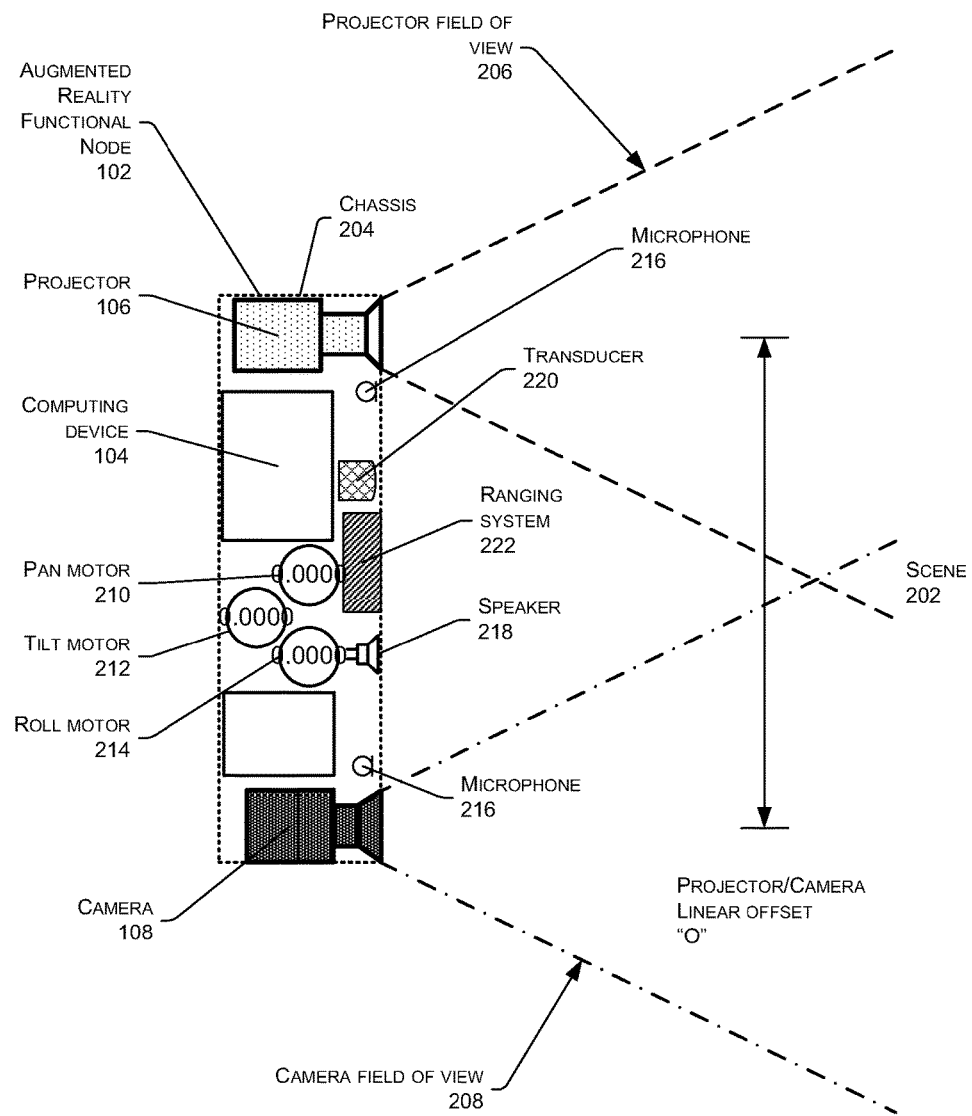
FIG. 2 illustrates an example ARFN that includes a computing device, a projector, a camera, and other selected components for allowing a user to interact with the ARFN with use of gestures interpreted by the ARFN.

The input/output interface 116, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the camera 108.

The interface module 122 may include a hand detection module 130 to detect the presence and appearance of hands within the environment 100 for use in recognizing gestures. In particular, the hand detection module 130 may be used to uniquely detect an open hand and/or a closed hand. As part of this process, the hand detection module 130 may use, for example, depth information from a depth sensor to segment objects found in the images. Once segmented, the hand detection module 142 may employ various techniques to analyze the contour in order to identify the object as being a hand, such as an open hand or a closed hand.

In response to detecting the hand and recognizing an associated gesture, the interface module 122 may interpret the gesture and cause the ARFN 102 to perform a corresponding action. For instance, if a user within the environment 100 makes a gesture requesting that the ARFN 102 project a certain piece of content, the interface module 122 may interpret the gesture and cause the projection module 124 to project the content via the projector 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

The computer-readable media 118 may store the system parameters datastore 128, which is configured to maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics. Further, the ranging system 222 may include a time-of-flight (ToF) sensor to generate depth data of the objects, such as hands, in the scene.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of 3D structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Object Detection in Environment

Figure 3:
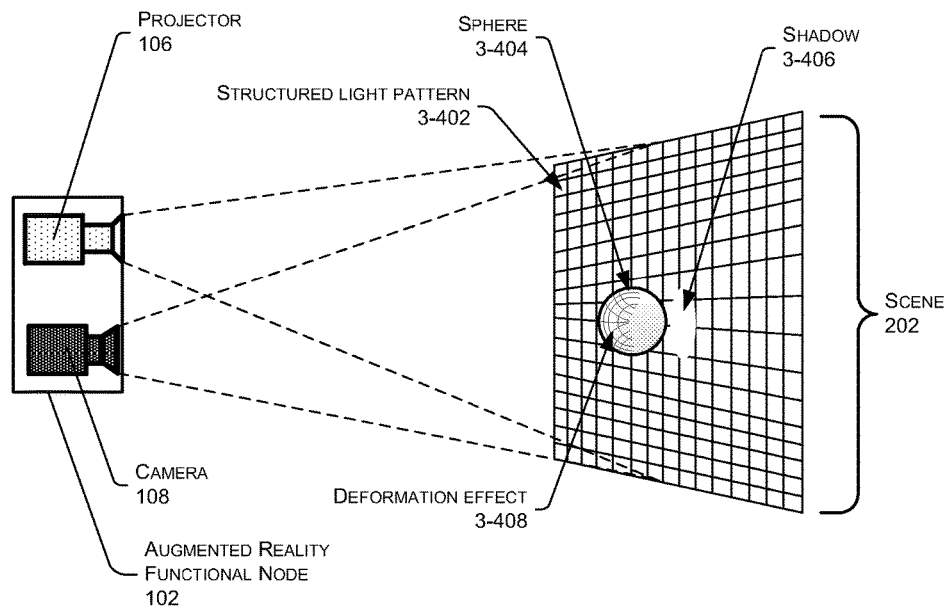
FIG. 3 is an illustrative diagram of the ARFN using structured light to identify surfaces, objects, and user interactions within an environment. By identifying user interactions, the ARFN is able to determine when a user is requesting that the ARFN perform a specified action.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Figure 4:
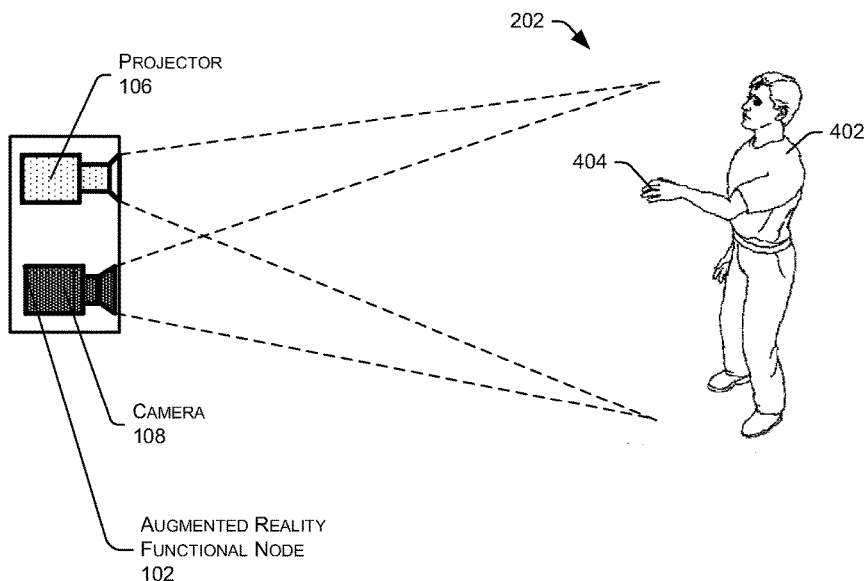
FIG. 4 is an illustrative diagram of the ARFN detecting the user's hand within an environment.

FIG. 4 illustrates an example of how the ARFN 102 may be used to observe and identify hand gestures within the scene 202. FIG. 4 shows a person 402 and the person's hand 404 as examples of objects within the environment 100 that may be analyzed by the ARFN 102.

In order to identify hand gestures, the ARFN 102 detects and tracks the hand 404 within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100. The captured 2D image may be a color or grayscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Hand Detection (Open and Closed)

Figure 5:
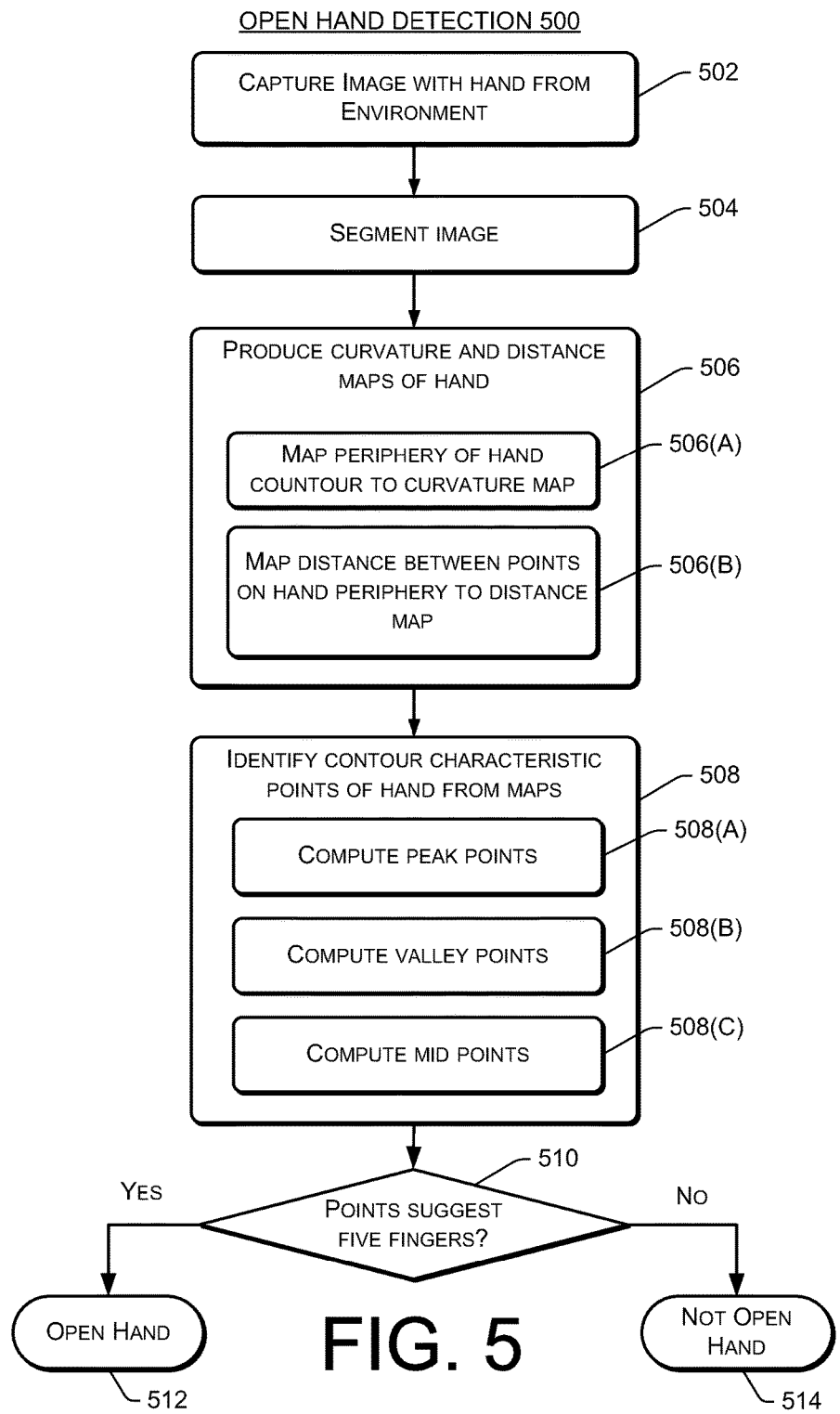
FIG. 5 illustrates an example flow diagram a process for detecting an open hand.

Described below are techniques of using a projection and imaging system (e.g., an ARFN 102) to detect hands within images captured of 3D environments, such as an augmented reality environment. One representative implementation of open hand detection is described below with reference to FIGS. 5 and 6. One representative implementation of closed hand detection is described below with reference to FIGS. 7 and 8A-8D. In FIGS. 5 and 7, the open and closed hand detection processes may be implemented by the architectures described herein with reference to FIGS. 1-4, or by other architectures. Each process in FIGS. 5 and 7 is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

FIG. 5 illustrates an example process 500 of detecting an open hand. At 502, an image of a scene is captured from a surrounding environment. The image includes a human hand, and may include other parts of the human or other objects, such as furniture, equipment, and the like. In the described embodiment, the image may be a 2D image captured by the camera 108. The image may also include other data objects, such as images containing 3D information corresponding to the scene 202. For example, certain captured images may show a reflected light pattern, based on a structured light pattern that is projected by the projector 106. Three dimensional information or characteristics regarding the scene may be obtained by analyzing the reflected light pattern. Alternatively, or in addition, the captured images may include images of the scene 202 taken from different perspectives, which may be analyzed in comparison to each other to reconstruct 3D characteristics of the scene 202. In still other implementations, the images may be formed from depth data generated by a time-of-flight (ToF) sensor.

At 504, the image from the scene is segmented. Object segmentation involves performing various types of shape analysis, including 2D and/or 3D techniques, to identify the hand 404 within the scene 202. In certain implementations, the segmentation uses depth information from a depth sensor on the ARFN 102 to produce a contour of the hand. This contour reveals an approximate outline of the objects found in the environment. Objects which are separated in space can be segmented from one another. The resulting contours can then be used to differentiate certain physical characteristics of the hand, such as contour characteristic points (e.g., finger tips, midpoints along fingers, valleys between fingers, etc.) and/or palm size.

At 506, curvature and distance maps are produced from various contours segmented from the scene, some of which are potential-hand contours. In one implementation, this action 506 involves two sub-processes including tracing the periphery of the contour of the hand segment to produce a curvature map at 506(A) and mapping distances between points on the contour of the hand to a distance map at 506(B). An example curvature map and an example distance map are described below with reference to FIG. 6.

At 508, contour characteristic points (which may also be referred to as "control points") of the potential-hand contour are identified in part by using the curvature and distance maps. This action 508 involves three sub-processes. At 508(A), the open hand detection process 500 computes peak points near or at the tips of the hand's fingers. As one approach, a two-step process may be used to find a peak. First, the convex hulls of the contour are identified. Second, a peak point is found where curvature of a convex hull is at a local maximum on the curvature map (i.e., signifying a change in direction at the finger tip) and distance is at a local minimum on the distance map (i.e., signifying that points at a finger tip are close together). At 508(B), the process 500 computes valley points at or near the joints between neighboring fingers. A valley point is found where curvature is at a local minimum on the curvature map (i.e., signifying a change in direction at the place between fingers) and distance is also at a local minimum of the distance map (i.e., signifying that points between fingers are close together). At 508(C), the process 500 computes mid points along the sides of the fingers. A mid point is where curvature is at a local minimum of the curvature map and distance is at a local maximum of the distance map (i.e., signifying greater distances between to neighboring points along the sides of the fingers).

At 510, the detection module 130 analyzes the points to determine whether the hand is open or not. In one approach, the five peak points are first examined, followed by an examination of the mid points and valley points. If there are two mid points per peak point, then the process determines whether there are four corresponding valley points between adjacent mid points. If these 19 points check out, the detection module 130 deems the hand as being an open hand at 512. However, if there are less than the expected number of points and/or the relationship of the points does not align as expected, the detection module 130 deems the hand as not being open at 514.

Figure 6:
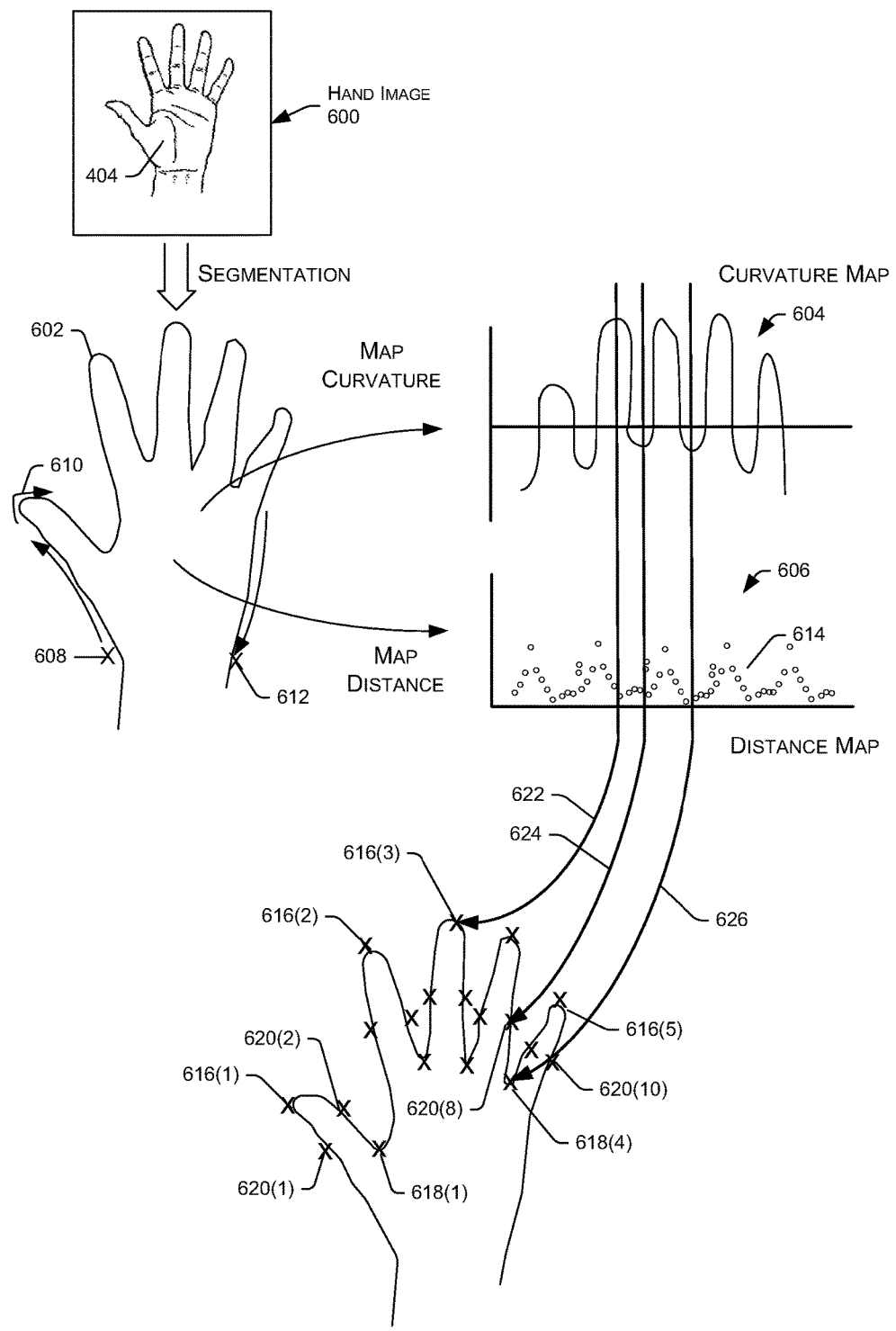
FIG. 6 illustrates one example of detecting an open hand using the open hand detection process of FIG. 5.
Figure 7:
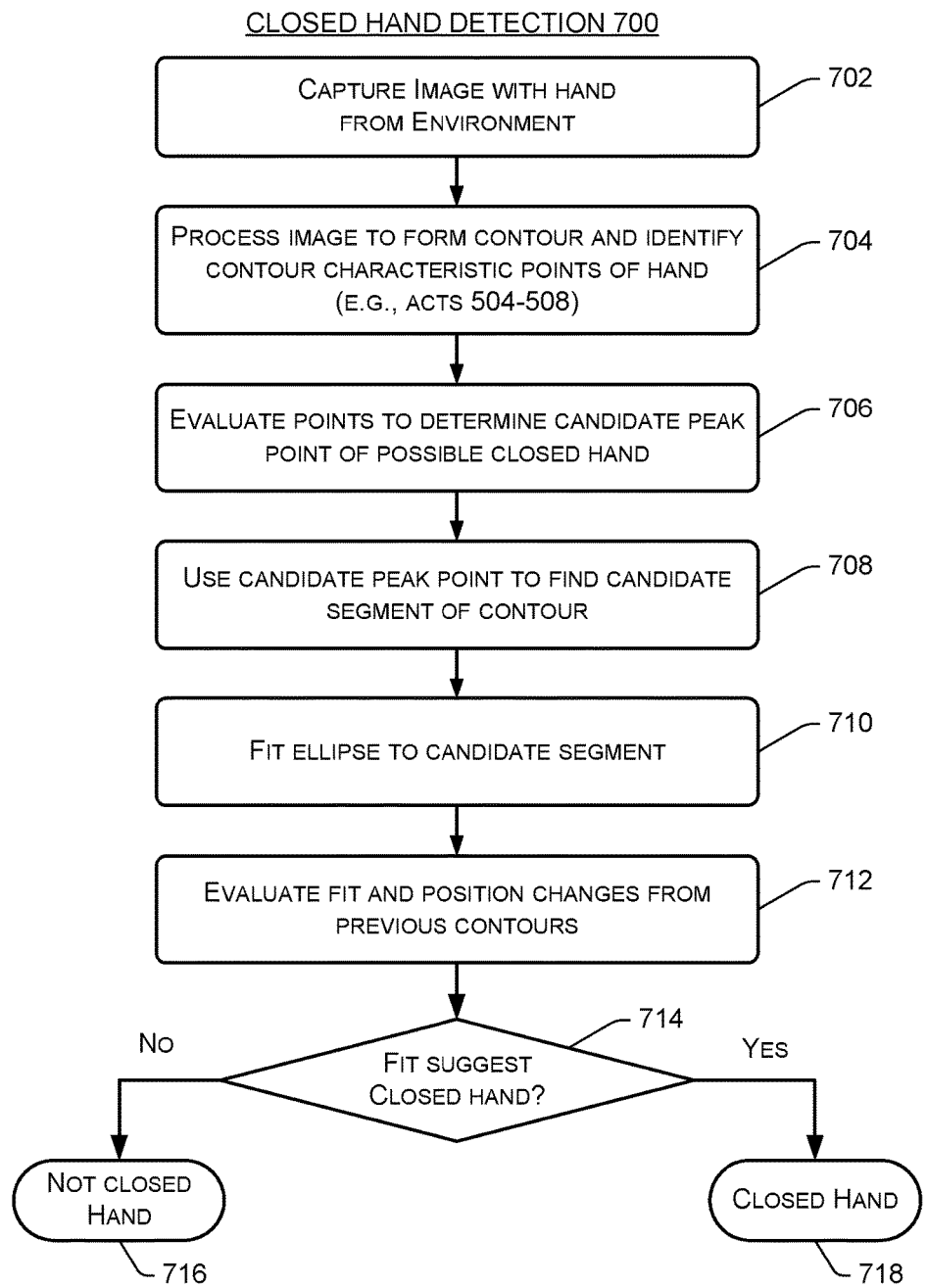
FIG. 7 illustrates an example flow diagram a process for detecting a closed hand.

FIG. 6 illustrates several aspects of the open hand detection process 500 as described with reference to FIG. 5. As shown, an image 600 having a hand 404 is captured from the environment by one or more cameras 108. In this illustration, the hand 404 is open with all five fingers independently distinguishable. The image is processed using a segmentation technique (act 504) to produce a contour 602 of the hand segment. The hand contour 602 also includes five independent fingers.

The hand contour 602 is mapped into two plots: a curvature map 604 and a distance map 606. This corresponds to the act 506 in FIG. 5. The curvature map 604 is formed by mapping the curvature of the hand contour 602 in terms of a predefined translation function associated with the curvature. The outer periphery line of the hand contour 602 may be traced beginning at a point 608 at the base of the palm, around each of the fingers (as represented by the arrows 610), and terminating at a point 612 at the base of the palm on the opposite side.

The translation function may be essentially any rule that graphically captures curvature of the hand segmented from the 2D image. For example, one function may be to express the contour in terms of direction changes along the hand where leftward movement is positive on the curvature map 604 and rightward movement is negative. Another example function may be to express in terms of vertical direction so that upper movement is positive on the curvature map 604 and downward movement is negative. Essentially any translation function may be used.

The distance map 606 is formed as a function of distance along the curvature of the hand contour 602. One approach to plotting the distance is to express the points 614 in the distance map 606 as an absolute value of the distance between points along the curvature. Accordingly, the distances between points along the lengths of the fingers tend to be greater in comparison to the distances between points along the finger tips and valleys. Said another way, points on transitions between positive and negative portions of the curvature map tend to be closer together than points between the positive and negative transitions.

The curvature map 604 and the distance map 606 are used together to identify contour characteristic points of the hand, per act 508 of FIG. 5. As shown in FIG. 6, the two plots are used to identify peak, valley, and mid points on the hand contour 602. If the hand is open, there should be five peak points 616(1)-616(5), four valley points 618(1)-618(4), and ten mid points 620(1)-620(10) (although not all reference numbers are included for ease of illustration). As illustrated by a reference line 622, a peak point at or near the tip of a finger, such as peak point 616(3), is computed as a point where the curvature is at a local maximum on the curvature map 604 (i.e., signifying a change in direction at the finger tip) and the distance is at a local minimum on the distance map 606 (i.e., signifying that points at a finger tip are close together).

As illustrated by a reference line 624, a midpoint along the side of a fingers, such as midpoint 620(8), is computed as a point where the curvature is at a local minimum on the curvature map 604 and distance is at a local maximum on the distance map 606 (i.e., signifying greater distances between to neighboring points along the sides of the fingers).

As illustrated by a reference line 626, a valley point at or near the joint between neighboring fingers, such as valley point 618(4), is computed as a point where the curvature is at a local minimum on the curvature map (i.e., signifying a change in direction at the place between fingers) and distance is also at a local minimum on the distance map (i.e., signifying that points between fingers are close together).

If the hand segment includes five peak points, with two midpoints per peak point and four corresponding valley points between adjacent midpoints, the hand is determined to be open. If, however, midpoints and/or valley points are not present, the hand is not an open hand.

It is noted that in some implementations, less than 19 points may be used. For instance, the hand detection module 130 may use less than 19 points, such as nine points comprised of the peak and valley points, but without the midpoints. Another alternative is to use peak points and midpoints for a combination of 15 points. Other combinations may be run. Further, the detection process may be run several times on the same contour wherever a series of peak and valley points is detected. In this manner, if there are some places in a contour where there are not enough peak and valley points to qualify as an open hand, they are rejected. Then, the process is continued to search the entire contour for a spot which matches the open-hand requirements.

FIG. 7 illustrates an example process 700 of detecting a closed hand. For purposes of this discussion, various actions in the process 700 are described with reference to illustrations in FIGS. 8A-8D for clarity and ease of discussion.

At 702, an image of a scene is captured from a surrounding environment. The image includes a human hand, and may include other parts of the human or other objects, such as furniture, equipment, and the like. In the described embodiment, the image may be a 2D image captured by the camera 108.

At 704, the image is processed to form the contour and identify the contour characteristic points of the hand. In one implementation, this may be accomplished through acts 504-508 of the open hand detection process 500 of FIG. 5, where segmentation is performed, followed by production of curvature and distance maps, followed by computation of points. However, in this case, there is not likely to be 19 points as the fingers are unlikely to be independently distinguishable. Recall, a closed hand is defined as four fingers extended from the palm, but touching one another, and an extended thumb that is separate from the four fingers.

Figure 8A:
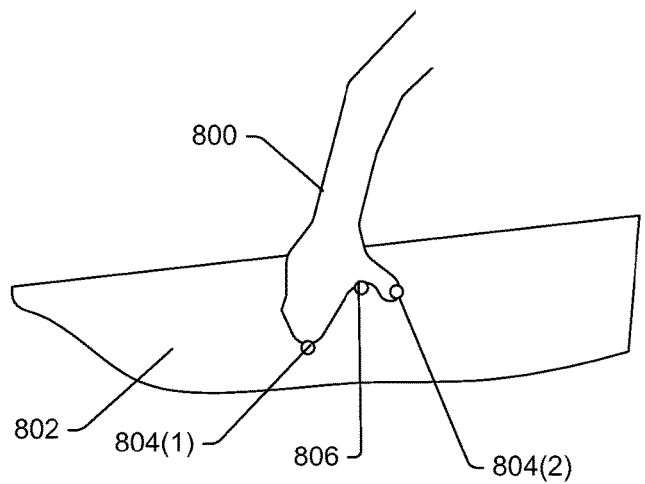
FIGS. 8A-8D provide a series of illustrations to show one example of detecting a closed hand using the closed hand detection process of FIG. 7.

FIG. 8A shows an example illustration in which an image of a hand above a desk is processed to produce a hand segment 800 and a desk segment 802. The segments are created using depth information from a depth sensor used in the ARFN 102, wherein the hand segment is closer to the depth sensor than the desk and hence the hand segment 800 appears to overlay the desk segment 802. Also shown in FIG. 8 is a set of contour characteristic points, including two peak points 804(1) and 804(2), separated by a valley point 806.

With reference again to FIG. 7, at 706 in the closed hand detection process 700, the points are evaluated to determine a candidate peak point of a possible closed hand. The candidate peak point may be any one of the peak points 804(1) or 804(2). Suppose, from FIG. 8A, that the most distant peak point 804(1) is selected for a candidate peak point.

Figure 8B:
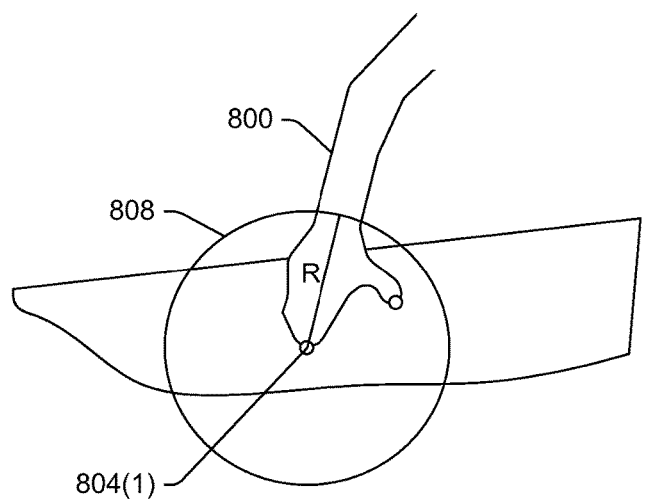

At 708, the candidate peak point is used to find a sub-segment of the hand contour 800. This act is illustrated in FIG. 8B in which the candidate peak point 804(1) is used to find a sub-segment. In this example, the sub-segment is computed as any portion of the hand contour 800 that falls within a circle 808 of radius R about the candidate peak point. The radius R is chosen so that the entire hand portion of the hand segment 800 is enclosed within the circle. The circle may further include portions of the forearm, but at least the hand is enclosed.

Figure 8C:
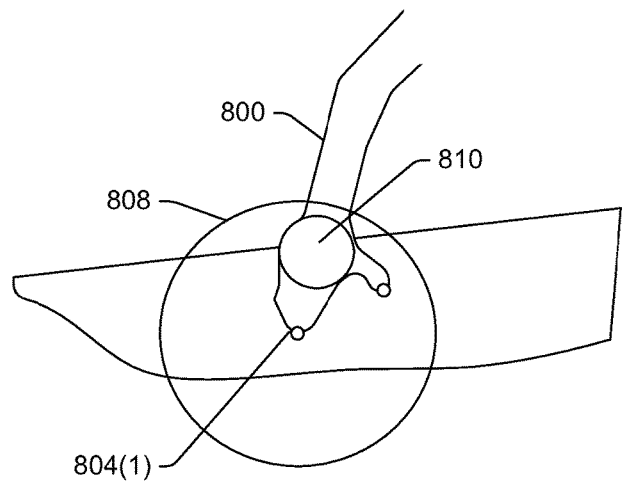

At 710 in FIG. 7, the closed hand process 700 finds an inscription circle within the candidate segment circle and attempts to fit an ellipse to the sub-segment defined by the circle 800. Generally, the inscription circle is sized to roughly approximate a size of the palm. It is the largest circle that can be drawn so that its circumference touches at least some of the boundaries at the top, bottom, and sides of the palm, in the contour. FIG. 8C illustrates an inscription circle 810 fitted within the circle 808. The inscription circle roughly approximates the palm area of the hand contour sub-segment.

It is noted that finding the palm region can be used for not only a closed hand detection process, but also for open-hand poses or other posed hand positions, or even for hand detection with an arbitrary pose. The detected palm can also be used for refining fingertip detection. Once the palm region is known, the center of the palm can be determined. Distance from the palm center to all the contour points within a circle of a predefined radius (e.g., approximate hand size) can be determined. The local maxima points correspond to the fingertips (peaks) and the local minima points are the valleys.

Figure 8D:
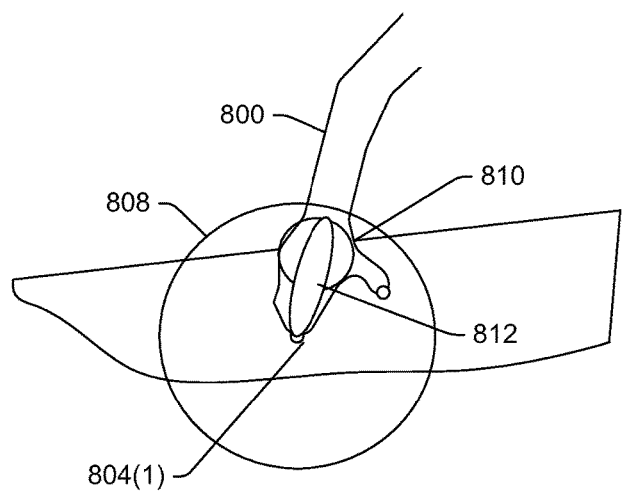

The fitted ellipse approximates the closed hand portion inclusive of the palm and adjoining fingers. FIG. 8D illustrates an ellipse 812 fitted within the circle 808. The ellipse 812 is oriented to intersect with the candidate peak point 804(1) and the periphery of the inscription circle 810.

At 712 in FIG. 7, the fit and position changes from previous contours are evaluated. In one implementation, the ellipse is evaluated to see if it roughly approximates the shape of a hand when all four fingers are extended, with neighboring fingers in contact. That is, in one implementation, the closed hand should appear in the contour as four fingers extending from the palm and grouped together such that the four fingers are seen as one large digit and not independently distinguishable. If so, the ellipse should approximately cover a significant portion of the hand contour. If not, portions of the hand are not covered by the ellipse, which would tend to suggest that the fingers are not all extended and/or that the fingers are not in contact with one another. It is noted that other geometric shapes may be used alternatively to an ellipse, such as a polygon. Furthermore, a closed-hand pose may vary from user to user. For instance, in another implementation, a closed hand may be defined as a grouping of all five fingers together (i.e., the hand segment 800 with the thumb also adjoining the four fingers). Generally, a few circle and ellipse models may be used to recognize the most likely closed hand poses.

At 714, the closed hand detection process determines whether the fit is suggestive of a closed hand. If so (i.e., the "yes" branch from 714), the process 700 deems the hand in the image as a closed hand. Conversely, if the fit is not suggestive of a closed hand (i.e., the "no" branch from 714), the process 700 deems the hand in the image as not being a closed hand.

In some cases, there may be more than one candidate peak point. In FIG. 8A, two peak points were identified. In such situations, acts 706-718 of the process 700 may be repeated for every candidate peak point in the contour.

Figure 9:
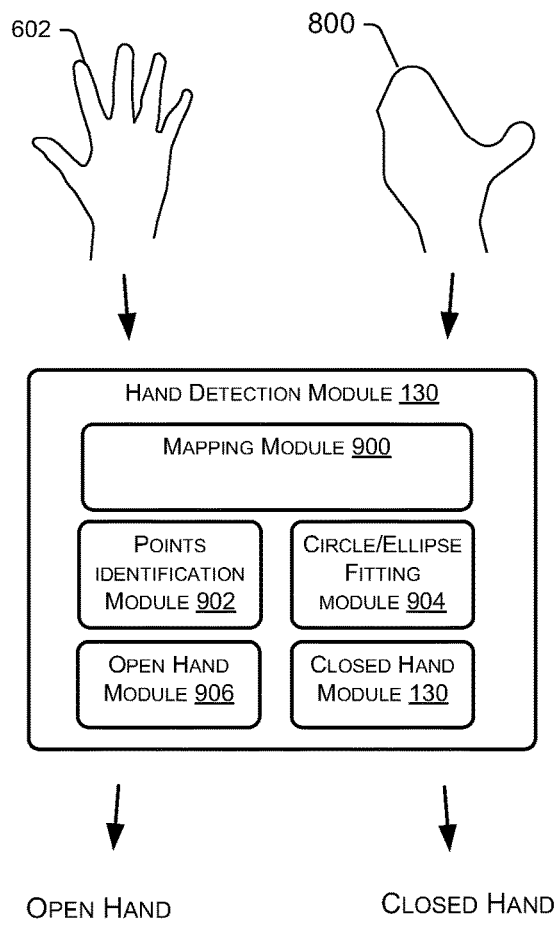
FIG. 9 illustrates one example implementation of a hand detection module to detect presence of an open hand and/or a closed hand.

FIG. 9 illustrates the hand detection module 130 in more detail according one possible implementation to detect the presence of an open hand and/or a closed hand. Suppose the images are captured and processed to create contours of hands present in the environment. A contour of a first hand 602 representing an open hand is shown, along with a contour of a second hand 800 representing a closed hand.

The hand detection module 130 includes a mapping module 900 to create the curvature and distance maps from points along the periphery of the hand contours. There may be many points along the periphery. The points are translated into 1D curvature and distance maps, as described above with respect to FIGS. 5 and 6. The hand detection module 130 further includes a point identification module 902 that finds certain contour characteristic points on the contour. Any number of points may be chosen as the characteristics points. For one implementation, three types of characteristic points are used, including peak points at the tips of the fingers, valley points at the intersection between fingers, and midpoints along the sides of the fingers between the peak points and the valley points.

A circle/ellipse fitting module 904 is further provided to fit the circles and ellipses for the closed hand detection process 700. This module 904 may execute, for example, algorithms to find a circle that approximates a palm size within a hand segment, and an ellipse that intersects both the inscription circle as well as a peak point to roughly approximate the shape of a closed hand with four fingers extend and touching one another.

The hand detection module 130 may further include an open hand module 906 and a closed hand module 908. The open hand module 906 includes the logic instructions to discern from the characteristic points whether the hand contour represents the predefined open hand. The closed hand module 908 includes the logic instructions to discern from the fitted ellipse whether the hand contour represents the predefined closed hand. The hand detection module outputs a result to other components in the ARFN for processing depending upon whether an open hand or a closed hand is detected as being part of a gesture from a user in the environment.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more projectors to project an interface into an environment;
   one or more cameras to capture an image of the environment, the image showing at least a hand of a person and the interface; and
   one or more non-transitory computer-readable media storing computer-executable instructions that, when executed by the one or more processors, cause the one or more processors to perform acts comprising:
   segmenting the image to produce a contour of the hand;
   identifying characteristic points along a periphery of the contour of the hand;
   determining a first number of peak points, the peak points corresponding to a first group of the characteristic points and representing finger tips of the hand;
   determining a second number of valley points, the valley points corresponding to a second group of the characteristic points and representing points between fingers of the hand;
   determining a third number of midpoints, the midpoints corresponding to a third group of the characteristic points, and wherein each midpoint represents a point between a peak point and a valley point; and
   determining, based at least in part on a sum of the first number, the second number, and the third number being at least nineteen, that the hand in the image is an open hand.

2. The system of claim 1, further comprising a depth sensor configured to collect depth information associated with the hand, and wherein segmenting the image comprises using the depth information to discern the contour of the hand.

3. The system of claim 1, further comprising:
   producing a curvature map from the characteristic points;
   producing a distance map derived from distances between the characteristic points; and wherein determining the first number, the second number, and the third number is based at least in part on the curvature map and the distance map.

4. The system of claim 1, wherein determining that the hand is the open hand is based at least in part on:
fitting a geometric object on an area of the contour of the hand; and
determining, based at least in part on the geometric object relative to the contour of the hand, that at least four of the fingers of the hand extend at least partially out of the geometric object.

5. The system of claim 1, further comprising:
capturing a subsequent image of the environment;
detecting a change in position of the hand from a first position in the image to a second position in the subsequent image; and
moving a cursor associated with the interface from a portion of the interface to a different portion of the interface.

6. A system comprising:
a display to present content within an environment;
a camera to capture an image of a hand within the environment; and
a computing device configured to:
determine a contour of the hand;
identify, based at least in part on the contour of the hand:
first characteristic points on a periphery of the contour of the hand, the first characteristic points corresponding to peak points of the hand, each of the peak points representing a finger tip of a finger of the hand;
second characteristic points corresponding to valley points, each of the valley points representing a point between two fingers of the hand; and
third characteristic points corresponding to midpoints, each of the midpoints representing a point between one of the peak points and one of the valley points;
determine that a first number of the first characteristic points is greater than a first threshold number;
determine that a second number of the second characteristic points is greater than a second threshold number;
determine that a third number of the third characteristic points is greater than a third threshold number;
determine that the hand associated with the image is open based at least in part on:
the first number being greater than the first threshold number;
the second number being greater than the second threshold number; and
the third number being greater than the third threshold number; and
perform, based at least in part on determining the hand is open, a task associated with the content.

7. The system of claim 6, wherein the at least one computing device is further configured to:
determine distances between the first characteristic points;
produce a curvature map from the first contour by translating the first characteristic points into values as a function of directional movement along the first characteristic points; and
produce a distance map from the distances between the first characteristic points along the periphery.

8. The system of claim 6, further comprising at least one projector to project a visual portion of the content onto a surface in the environment.

9. The system of claim 6, wherein the first threshold number is five, the second threshold number is four, and the third threshold number is ten.

10. A system comprising:
one or more processors; and
one or more non-transitory computer-readable media storing computer-executable instructions that, when executed by the one or more processors, cause the one or more processors to perform acts comprising:
segmenting an image that includes at least a hand of a person to produce a contour of the hand;
identifying characteristic points on the contour of the hand;
determining that the characteristic points include peak points corresponding to fingertips of the hand;
determining that the characteristic points include valley points corresponding to an area between adjacent fingers of the hand;
determining that the characteristic points include midpoints, each midpoint corresponding to a point between a peak point of the peak points and a valley point of the valley points;
determining that the contour includes a finger based at least in part on identifying at least a threshold amount of characteristic points, the threshold amount of characteristic points including at least one of the peak points, at least two of the valley points, and at least two of the midpoints
determining, based at least in part on determining that the contour includes the finger, that the contour of the hand represents an open hand.

11. The system of claim 10, the acts further comprising:
producing a curvature map by translating points along a periphery of the contour of the hand into a set of values as a function of directional movement along the points; and
producing a distance map from the points on the periphery of the contour of the hand, the distance map including distances between at least some of the points on the periphery of the contour of the hand.

12. A computer-implemented method comprising:
under control of one or more computer systems configured with executable instructions,
displaying content in an environment;
determining, based at least in part on image data generated by a camera within the environment, points around a periphery of a contour of a hand;
producing, based at least in part on the points around the periphery of the contour of a hand, a curvature map;
producing, based at least in part on distances between the points on the periphery of the contour of the hand, a distance map;
identifying, based at least in part on the curvature map and the distance map, characteristic points on the contour of the hand, the characteristic points comprising:
first midpoints corresponding to a first side of individual fingers of the hand;
second midpoints corresponding to a second side of the individual fingers of the hand; and
peak points corresponding to the individual fingers of the hand, wherein a peak point of the individual fingers represents a point between a first midpoint and a second midpoint of the individual fingers of the hand;

determining that the contour of the hand corresponds to a partially open hand based at least in part on:
    a distance between the first midpoint and the second midpoint of the individual fingers of the hand; and
    a sum of the first midpoints, the second midpoints, and the peak points of the hand exceeding a threshold number;
identifying, based at least in part on determining that the hand corresponds to the partially open hand, at least one gesture;
and
identifying a task to perform based at least in part on the at least one gesture.

13. A system comprising:
one or more processors; and
one or more non-transitory computer-readable media storing computer-executable instructions that, when executed by the one or more processors, cause the one or more processors to perform acts comprising:
    displaying content on at least one surface of an environment;
    receiving image data corresponding to an image including at least a hand of a person in the environment;
    segmenting the image to produce a contour of the hand;
    identifying characteristic points on the contour of the hand, the characteristic points corresponding to midpoints along sides of a finger between a peak point and a valley point of an adjacent finger;
    fitting a geometric object onto the contour of the hand such that the geometric object encompasses a substantial portion of a palm of the hand in the contour of the hand;
    determining, based at least in part on fitting the geometric object, that at least a threshold amount of the characteristic points extend at least partially out of the geometric object;
    determining, based at least in part on a relationship of the geometric object to the characteristic points and the characteristic points being greater than the threshold amount, at least one hand gesture;
    and
    identifying, based at least in part on determining the hand gesture, at least one action to perform on the content.

14. The system of claim 13, the acts further comprising:
producing, based at least in part on translating the characteristic points along a periphery of the contour of the hand into a set of values as a function of directional movement along the characteristic points, a curvature map; and
producing, based at least in part on characteristic points on the periphery of the contour of the hand, a distance map identifying a distance between two neighboring characteristic points around the periphery of the contour of the hand.

15. A computer-implemented method comprising:
under control of one or more computer systems configured with executable instructions,
receiving, by at least one computing device, image data corresponding to an image of an environment including at least a hand of a person;
determining, by the at least one computing device, a hand contour of the hand;
identifying, by the at least one computing device, characteristic points on the hand contour corresponding to midpoints, peak points, and valley points;
determining, by the at least one computing device, a first number of characteristic points that correspond to the peak points;
determining, by the at least one computing device, a second number of characteristic points that correspond to the valley points;
determining, by the at least one computing device, a third number of characteristic points that correspond to the midpoints; and
determining, by the at least one computing device, that the hand is an open hand based at least in part on:
    the first number of the characteristic points being greater than a first threshold number;
    the second number of the characteristic points being greater than a second threshold number; and
    the third number of the characteristic points being greater than a third threshold number.

16. The computer-implemented method of claim 15, wherein determining that the hand is the open hand is based at least in part on identifying two midpoints associated with each peak point of the peak points.

17. The computer-implemented method of claim 15, wherein determining that the hand is the open hand is based at least in part on identifying two midpoints associated with each peak point and four valley points between adjacent fingers of the hand.

18. The computer-implemented method of claim 15, wherein the first threshold number is greater than the second threshold number, and wherein the third threshold number is greater than the first threshold number.

19. The computer-implemented method of claim 15, wherein determining that the hand is the open hand comprises determining that the hand is the open hand based at least in part on a sum of the first number of the characteristic points, the second number of the characteristic points, and the third number of the characteristic points being greater than a fourth threshold number.

20. The computer-implemented method of claim 19, wherein the fourth threshold number is nineteen.

* * * * *